United States Patent [19]

Kamp et al.

[11] 4,054,993

[45] Oct. 25, 1977

[54] ROTARY CUTTING ASSEMBLY HAVING NOVEL FLAIL

[76] Inventors: Walter B. Kamp, 206 Bellevue Blvd. South; Richard L. Kimmel, 1403 Lawrence Lane,, both of Bellevue, Nebr. 68005; Alvin L. P. Aasgaard, III, 3623 Armbrust, Omaha, Nebr. 68124

[21] Appl. No.: 724,287

[22] Filed: Sept. 20, 1976

[51] Int. Cl.² .............................................. B26B 7/00
[52] U.S. Cl. ...................................... 30/276; 56/12.7
[58] Field of Search .................... 56/12.7, 295; 30/276

[56] References Cited

U.S. PATENT DOCUMENTS

| | | | |
|---|---|---|---|
| 3,297,014 | 1/1967 | Snow | 125/21 |
| 3,340,682 | 9/1967 | Ely | 56/295 |
| 3,826,068 | 7/1974 | Ballas | 56/12.7 |
| 3,831,278 | 8/1974 | Voglesonger | 56/12.7 |

FOREIGN PATENT DOCUMENTS

| | | | |
|---|---|---|---|
| 2,316,025 | 10/1974 | Germany | 30/166 R |

*Primary Examiner*—Harold D. Whitehead
*Attorney, Agent, or Firm*—George R. Nimmer

[57] ABSTRACT

Disclosed are rotary cutting assemblies for cutting growing vegetation with a tough whirling flail. The assemblies generally comprise an elongate lineal shaft extending along and powerably rotatable about a vertical-axis, a horizontal base-plate in co-rotatable association with the shaft lower part, retainer means attached to the base-plate, and an elongate horizontal flexible flail extending radially outwardly from the retainer means along a horizontal-axis. For the purposes of promoting vegetation cutting action as the flail rotates about the shaft, and consistent with operational safety, the flail comprises a central-core along the horizontal-axis of a tough flexible resinous material and an external-contour of varying cross-sectional size. Preferably, the external-contour is provided by prominent protuberances surrounding the central-core and which enhances vegetation cutting without danger of inflicting injury to the operator.

8 Claims, 16 Drawing Figures

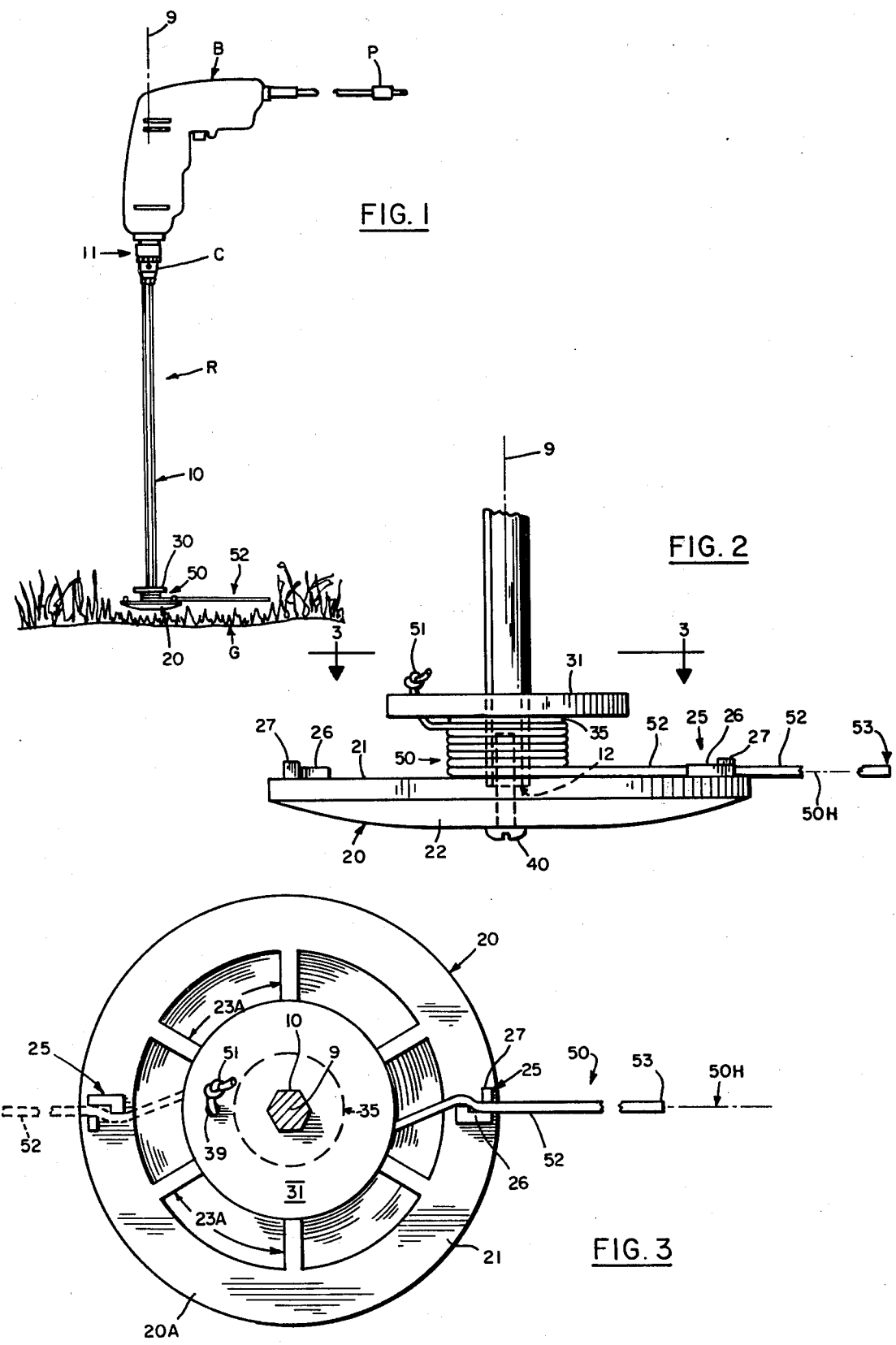

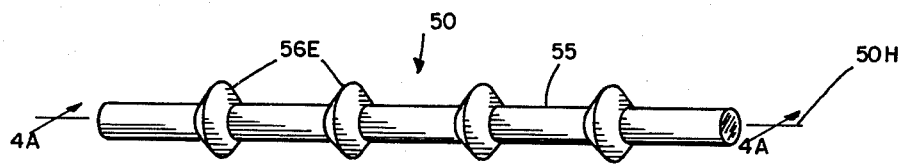
FIG.4
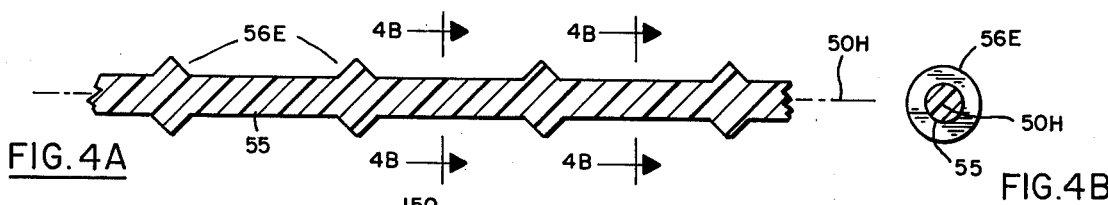
FIG.4A FIG.4B
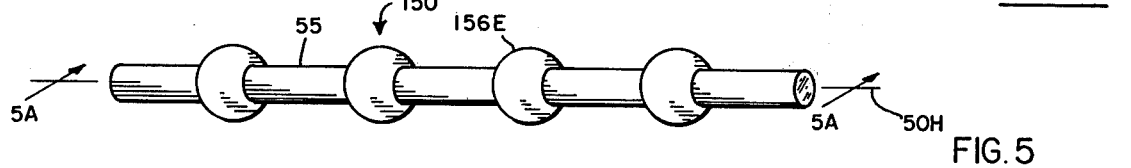
FIG.5
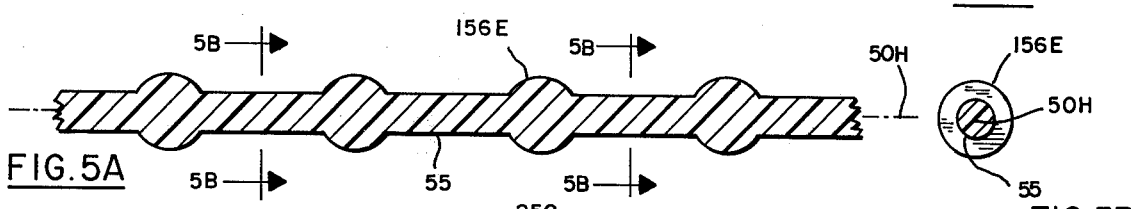
FIG.5A FIG.5B
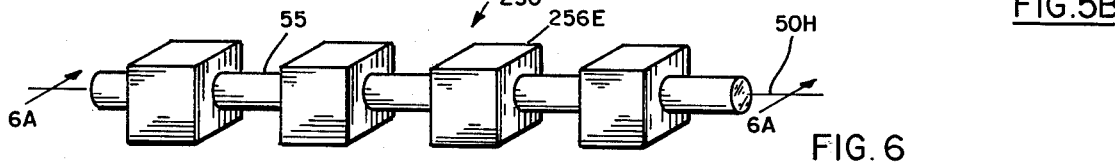
FIG.6
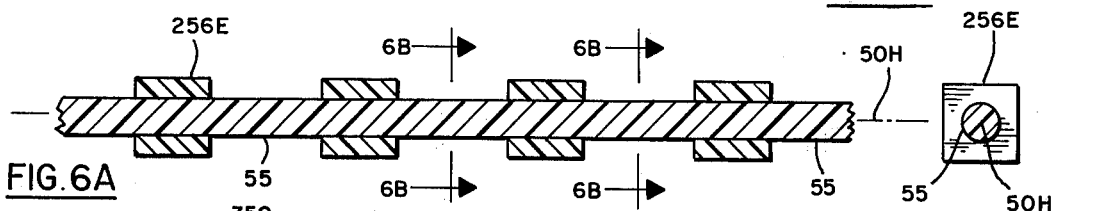
FIG.6A FIG.6B
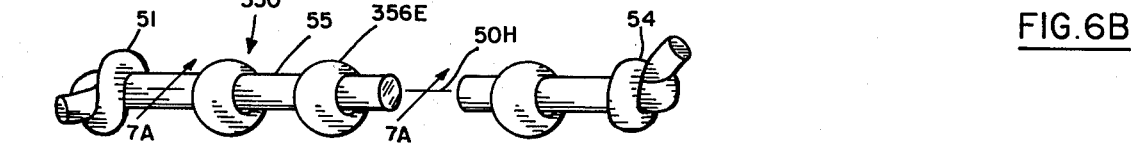
FIG.7
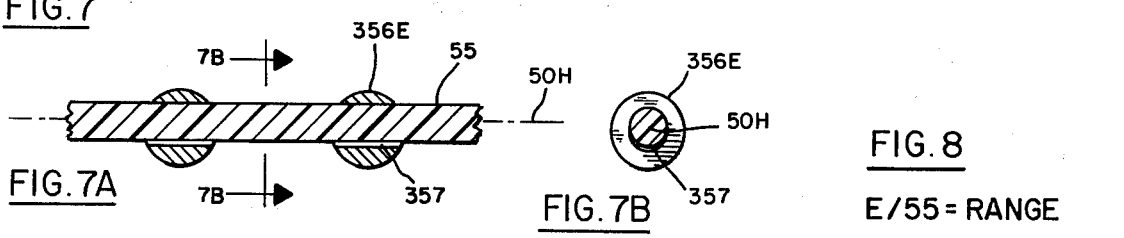
FIG.7A FIG.7B
FIG.8
E/55 = RANGE

ROTARY CUTTING ASSEMBLY HAVING NOVEL FLAIL

Rotary cutting assemblies for cutting growing vegetation with whirling filamentous non-metallic flail, and especially intended for household lawn trimming, are generally alluded to in the prior art including, iner alia, U.S. Pat. Nos. 3,708,967 and 3,826,068. Inasmuch as the flail needs to rapidly rotate in order to cut growing vegetation, operational safety is of prime concern. If the flail were to be constructed of metallic wire, during use wire pieces are apt to break away and cause injury to the operator or to bystanders. For this reason, flails are usually constructed as filaments of tough resinous materials which are not apt to cause injury. However, the use of resinous filamentous flails does result in sacrifice of vegetation cutting ability as compared to hard metallic wire flails. Faced with this dilemma, recent prior art workers have utilized resinous filamentous flails or uniform polygonal cross-sectional size and shape, the theory being that that polygon corners will enhance weed/vegetation cutting. However, this theory and approach have lead to only minor improvements in the flail cutting ability.

Prior art devices suffer from other noteworthy disadvantages and deficiencies. For example, many of the prior art devices are too cumbersome to permit convenient, comfortable, and troublefree use by the typical householder. Others are mechanically unreliable and difficult, if not impossible, to repair. Most are too expensive for the average householder to purchase by virtue of requiring an integrally incorporated special power plant, such as an electric motor designed exclusively for the rotary cutting assembly.

It is accordingly the general object of the present invention to provide improved and economical rotary cutting assemblies of the whirly flail type and which overcomes many of the disadvantages and deficiencies of prior art structures. An important ancillary object is to provide an especially efficaceous flail concept for cutting growing vegetation and consistent with operational safety. Another important ancillary objective is to provide rotary cutting assemblies which are amenable to being powered by a conventional portable drill chuck which is already possessed by many householders for other purposes e.g. a household drill, etc.

With the above and other objects and advantages in view, which will become more apparent as this description proceeds, the vegetation cutting assemblies herein generally comprise: an elongate lineal shaft extending along a vertical-axis; a horizontal base-plate co-rotatably associated with the shaft nearer its bottom-end; retainer means attached to the base-plate; and an elongate horizontal flexible flail extending radially outwardly from the retainer along a horizontal-axis, the flail comprising a tough flexible resinous central-core extending along the flail horizontal-axis and an external-contour of varying cross-sectional size, the external-contour preferably being in the form of prominent protuberances surrounding the central-core and which enhance vegetation cutting.

In the drawing, wherein like characters refer to like parts in the several views, and in which:

FIG. 1 is an elevational view of a representative embodiment of the rotary cutting assemblies with novel flails of the present invention;

FIG. 2 is a detail view of the lower cutting head portion of the FIG. 1 representative embodiment;

FIG. 3 is a sectional plan view taken along line 3—3 of FIG. 2;

FIG. 4 is a perspective view of a representative length of one form of the novel flail concept of the present invention;

FIG. 4A is a sectional elevational view taken along line 4A—4A of FIG. 4;

FIG. 4B is a transverse cross-sectional view taken along line 4B—4B of FIG. 4A;

FIG. 5 is a perspective view of another form of the flail concept of the present invention;

FIG. 5A is a sectional elevational view taken along line 5A—5A of FIG. 5;

FIG. 5B is a transverse cross-sectional view taken along line 5B—5B of FIG. 5A;

FIG. 6 is a perspective view of yet another form of the flail concept of the present invention;

FIG. 6A is a sectional elevational view taken along line 6A—6A of FIG. 6;

FIG. 6B is a transverse cross-sectional view taken along lines 6B—6B of FIG. 6A;

FIG. 7 is a perspective view of still another form of the flail concept of the present invention;

FIG. 7A is a sectional elevational view taken along line 7A—7A of FIG. 7;

FIG. 7B is a transverse cross-sectional view taken along line 7B—7B of FIG. 7A.

FIG. 8 schematically refers to the transverse cross-sectional size relationship between the flail central-core and the external-contour thereof.

As indicated in FIGS. 1-3, the typical rotary cutting assembly "R" generally comprises an elongate lineal shaft 10 extending along and powerably rotatable about a vertical-axis 9. Herein, the longitudinally extending vertical shaft 10 has a top-end 11 for removable insertion into a portable operator-held powered chuck "C", such as typified by a powered conventional hand-drill "B". However, other powering means might be aptly utilized for rapidly rotating the shaft 10 about its axis 9. Co-rotatably associated with shaft 10 nearer its bottom-end is a base-plate (e.g. 20) which herein has adjacent thereto a convolutely coiled supply of tough flexible flailing (e.g. 50, 150, 250, 350). Flail lengths, which might be leadward portions 52-53 of coil 50, are extendable radially outwardly of axis 9 and base-plate 20 along horizontal-axis 50H to cut growing vegetation at the earth's surface "G" as shaft 10 and base-plate 20 together rotate upwards of 1800 rpm about axis 9. Preferably, the length of shaft 10 is within the length of at least 12 to 18 inches so that a standing operator (e.g. holding powering means "B") may be able to accomplish the vegetation cutting task in comfortable non-stooping posture. As the vegetation cutting procedure proceeds over extended time periods, flail leadward portions, either as a discrete finite length or from indeterminate coil supply, need to be periodically removably secured to the base-plate, as with suitable retainer means e.g. 25.

Elongate lineal shaft 10 is preferably of non-circular cross-sectional shape, including near top-end 11 and bottom-end 12, to promote secure co-rotatable engagement with rotating chuck "C" and with the downwardly remote cutting head (e.g. 20,30). Uniform polygonal shapes and sizes are preferred for the shaft cross-section, such as the hexagonal shape illustrated in FIG. 3.

A base-plate (e.g. 20) is co-rotably associated with shaft 10 nearer its bottom-end 12 and lies substantially perpendicular to axis 9. Base-plate 20 includes a peripheral-edge 20A lying within a horizontal plane, periphery 20A being herein of circular shape with axis 9 at its geometric center. The base-plate includes a pair of surfaces extending transversely of axis 9, including a lower-surface 22 (herein of frustro-spheroidal shape) and an upper-surface 21 (herein defining a horizontal plane perpendicular to axis 9).

Attached to the base-plate and extending upwardly from upper-surface 21 is suitable retainer means (e.g. 25) for removably securing flail (e.g. 50, 150, 250, 350) to the base-plate, the retainer means being located nearer the base-plate peripheral-edge 20A than to its geometric center 9. There might be a plurality of retainer means preferably spaced at substantially equal angular intervals about and like distances radial from vertical-axis 9, whereby alternate positions for the flail leadward portions (e.g. 52–53) are possible as indicated in FIG. 3 phantom line.

The base-plate component 20 shown comprises a central circular hub 23 surrounding axis 9 with a plurality of radial horizontal ribs 23A (spaced at equal angles about axis 9) extending outwardly from hub 23 toward periphery 20A. Ribs 23A and hub 23 are located above frusto-spheroidal lower-surface 22 and together are herein co-planar at base-plate upper-surface 21. Preferably, the base-plate and the retainer means (25) are together singularly constructed of a hard resinous material. For example, each retainer means herein desirably comprises an L-shaped boss 26 and a lug 27 each upstanding from plane 21, the horizontal distance between boss 26 and lug 27 being sufficiently close to permit a tight frictional manually-pressed fit therebetween for the flail (50, 150, 250, 350, etc.). It is to be understood that the retainer means shown i.e. 25, is representative only of the means for attaching flail, either as discrete length or as indeterminate spooled length, to the base-plate.

When the flail is stored in coil form about axis 9, there are axial confinement means (30–31) for maintaining the stored flail longitudinally confined toward the rotating base-plate 20, and herein at its upper-surface 21. Moreover, the axial confinement means is preferably co-rotatable with the shaft (10) and the base-plate (20). Herein illustrated, the confinement means comprises a singly-flanged (31) spool 30 having its upright collar 35 surrounding shaft 10. The coiled flail knotted trail portion 51 passes downwardly through flange aperture 39.

The improved flail concept of the present invention comprises a flexible central-core (55) singularly constructed of a tough resinous material and which filamentous central-core extends along the flail horizontal-axis 50H. The flail concept also includes an elongate external-contour "E" surrounding the central-core 55 and axis 50H and which external-contour is of varying transverse cross-sectional size along the flail length. As a result thereof, vegetation cutting ability is greatly enhanced as compared to prior art flails which are of regular cross-sectional size. Desireably, the flail external-contour is of regularly periodically varying cross-sectional size along axis 50H, and desirably too of regularly periodically varying cross-sectional shape along said axis 50H. Preferably, the external-contour is defined by protuberances (e.g. 56E, 156E, 256E) respectively surrounding and spaced at regular intervals along the central-core 55. The protuberances are sufficiently prominent to enhance vegetation cutting action, as the protuberances impinge upon the growing vegetation, yet without so inducing undue stress upon central-core 55 which normally has a small diameter within the range of about 1/16 to 3/16 inch. In this regard, the transverse cross-sectional size of the central-core compared to the protuberance (e.g. as seen in FIGS. 4B, 5B, 6B, and 7B) bears a ratio within the range of one-fourth to three-fourths, and preferably within the range of about one-third of two-thirds.

With the flail embodiments 50 and 150, the bead-like protuberances 56E and 156E are secured to the central-core 55 at regular intervals by singularly constructing central-core and protuberances of the same resinous structural material. For embodiment 50, the protuberances each have the shape of two identical end-to-end cones abuttably merging at their larger ends whereby the smaller ends merge at central-core 55. Embodiment 50 has especially meritorious vegetation cutting ability, and can be economically formed by rolling of heavier filaments. For embodiment 150, each of the bead-like protuberances is of spherical shape.

For embodiment 250, each of the bead-like protuberances 256E is of cubical shape. Herein, cubes 256E tightly frictionally surround the circularly cross-sectioned central-core 55.

For embodiment 350, each of the bead-like protuberances 356E loosely slidably surrounds the central-core 55, as indicated at 357. However, because of the free slidability for beads 356E, there are necessarily longitudinal confinement means, herein the two ends of central-core 55 being amply knotted at 51 and 54.

From the foregoing, the construction and operation of the rotary cutting assembly having novel flail will be readily understood and further explanation is believed to be unnecessary. However, since numerous modifications and changes will readily occur to those skilled in the art, it is not desired to limit the invention to the exact construction shown, and accordingly, all suitable modifications and equivalents may be resorted to, falling within the scope of the appended claims.

We claim:

1. Rotary cutting assembly for cutting vegetation with a rapidly whirling flail and comprising:

A. an elongate lineal shaft extending along a vertical-axis, the shaft having a bottom-end and a top-end, said shaft being powerably rotatable about its vertical-axis;

B. A base-plate co-rotatably associated with the shaft and located nearer the shaft bottom-end, said base-plate including a peripheral-edge lying within a horizontal plane and with the shaft vertical-axis at the substantial geometric center of the base-plate; and C. at least one retainer means attached to the base-plate for removably securing a flail to the base-plate, said at least one retainer being located nearer the base-plate peripheral-edge than to the shaft vertical axis; and D. An elongate horizontal flexible flail extending along a horizontal-axis extending radially outwardly from the shaft and continuing through the retainer means, said flail being wholly singularly constructed of tough resinous material and which comprises a central-core extending along the flail horizontal-axis, the flail also having an elongate external-contour surrounding the central-core and which flail external-contour is of regularly periodically varying cross-sectional size and shape along the entire flail length to provide numerous protuberances at regular intervals therealong, said multi-protuberances flail promoting efficaceous vegetation cutting action as said horizontal flail rotates about the shaft vertical-axis.

2. The combination of claim 1 wherein the flail transverse cross-sectional dimensional size of the central-core to that of the intervening protuberances bears a ratio within the range of one-fourth to three-fourths.

3. The flail of claim 2 wherein the central-core is of uniform circular transverse cross-sectional shape and size along and having a diameter within the range of about 1/16 to 3/16 inch; and wherein the said ratio is within the range of one-third to two-thirds.

4. The flail of claim 3 wherein the protuberances are beads of substantially spherical shape.

5. The flail of claim 3 wherein the protuberances are beads, each bead having the shape of two identical end-to-end cones merging at their larger ends whereby each bead tapers in both directions to the central-core.

6. The combination of claim 3 in further combination with a portable operator-graspable powered drill chuck, the shaft top-end being removably secured by the chuck and located below the powering means therefor.

7. The combination of claim 1 wherein a portion of the lengthy multi-protuberances flail is coilably stored around the shaft, there being axial confinement means for maintaining the said stored flail portion longitudinally confined toward the rotatable base-plate.

8. The combination of claim 7 wherein the stored coiled portion of the multi-protuberances flail is located above the base-plate and surrounding a singly-flanged spool confinement means and which spool is co-rotatable with the shaft and base-plate.

* * * * *